(12) United States Patent
Kendall

(10) Patent No.: US 12,497,156 B2
(45) Date of Patent: *Dec. 16, 2025

(54) D-TRUSS WING STRUCTURE FOR AN UNMANNED AERIAL VEHICLE

(71) Applicant: AEROVIRONMENT, INC., Arlington, VA (US)

(72) Inventor: Greg T. Kendall, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/003,121

(22) Filed: Dec. 27, 2024

(65) Prior Publication Data

US 2025/0128808 A1   Apr. 24, 2025

Related U.S. Application Data

(63) Continuation of application No. 17/797,808, filed as application No. PCT/US2021/016735 on Feb. 5, 2021, now Pat. No. 12,214,875.

(Continued)

(51) Int. Cl.
*B64C 3/18*   (2006.01)
*B64C 3/10*   (2006.01)
(Continued)

(52) U.S. Cl.
CPC ............... *B64C 3/187* (2013.01); *B64C 3/10* (2013.01); *B64C 3/26* (2013.01); *B64C 39/024* (2013.01); *B64U 10/25* (2023.01); *B64U 30/10* (2023.01)

(58) Field of Classification Search
CPC .. B64C 3/187; B64C 3/26; B64C 9/22; B64C 3/16; B64C 31/00; B64C 31/02;
(Continued)

(56) References Cited

U.S. PATENT DOCUMENTS

| 2,136,265 A | * | 11/1938 | Petty | ........................ | B64C 3/00 244/119 |
| 4,095,760 A | | 6/1978 | Sommer et al. | | |

(Continued)

FOREIGN PATENT DOCUMENTS

| CN | 105438444 A | * | 3/2016 | ............... B64C 3/56 |
| CN | 110271659 A | * | 9/2019 | ............... B64C 3/56 |

(Continued)

*Primary Examiner* — Philip J Bonzell
(74) *Attorney, Agent, or Firm* — Command IP LLP; Michael Zarrabian; Eric Aagaard

(57) ABSTRACT

Systems, devices, and methods including a leading edge tubular member; an upper tubular member; a lower tubular member; one or more upper rib members connected between the leading edge tubular member and the upper tubular member; one or more lower rib members connected between the leading edge tubular member and the lower tubular member; a rigid sandwich shell disposed between the upper tubular member and the leading edge tubular member; and a sandwich shear web disposed between the upper tubular member and the lower tubular member; where the rigid sandwich shell and the sandwich shear web form a D-shape.

20 Claims, 6 Drawing Sheets

Related U.S. Application Data

(60) Provisional application No. 62/970,827, filed on Feb. 6, 2020.

(51) Int. Cl.
*B64C 3/26* (2006.01)
*B64C 39/02* (2023.01)
*B64U 10/25* (2023.01)
*B64U 30/10* (2023.01)

(58) Field of Classification Search
CPC B64C 31/028; B64C 7/00; B64C 1/00; B64C 3/38; B64C 3/54; B64C 3/56
See application file for complete search history.

(56) References Cited

U.S. PATENT DOCUMENTS

| | | | |
|---|---|---|---|
| 2017/0305525 A1 | 10/2017 | Xi et al. | |
| 2018/0118327 A1 | 5/2018 | Blevins et al. | |
| 2018/0273159 A1* | 9/2018 | Chengalva | B64F 5/00 |
| 2019/0185137 A1* | 6/2019 | Orchard | B64C 3/56 |

FOREIGN PATENT DOCUMENTS

| | | | | |
|---|---|---|---|---|
| CN | 115583333 A * | 1/2023 | | B64C 3/50 |
| CN | 117602059 A * | 2/2024 | | B64C 3/26 |
| JP | 2015502883 A | 1/2015 | | |

\* cited by examiner

D-TRUSS WING STRUCTURE FOR AN UNMANNED AERIAL VEHICLE

CROSS-REFERENCE TO RELATED APPLICATIONS

This application is a continuation of U.S. Non-Provisional patent application Ser. No. 17/797,808, filed Aug. 5, 2022, which is a 35 U.S.C § 371 National Stage Entry of International Application No. PCT/US21/16735, filed Feb. 5, 2021, which claims priority to and the benefit of U.S. Provisional Patent Application No. 62/970,827, filed Feb. 6, 2020, the contents of all of which are hereby incorporated by reference herein for all purposes.

TECHNICAL FIELD

Embodiments relate generally to wing structures, and more particularly to a D-truss wing structure for an unmanned aerial vehicle.

BACKGROUND

An aerial vehicle may include one or more wings to sustain horizontal flight. These wings may sustain various loads during flight. If these loads are not properly dealt with, the wings may sustain damage and/or the lifespan of the aerial vehicle may be negatively impacted. Aerial vehicles may be manned or unmanned. A manned aerial vehicle may be controlled by a pilot. An unmanned aerial vehicle (UAV) may be remotely controlled by an operator and/or autonomously controlled by a processor.

SUMMARY

A system embodiment may include: a leading edge tubular member; an upper tubular member; a lower tubular member; one or more upper rib members connected between the leading edge tubular member and the upper tubular member; one or more lower rib members connected between the leading edge tubular member and the lower tubular member; a rigid sandwich shell disposed between the upper tubular member and the leading edge tubular member; and a sandwich shear web disposed between the upper tubular member and the lower tubular member; where the rigid sandwich shell and the sandwich shear web form a D-shape.

In additional system embodiments, the leading edge tubular member, the upper tubular member, and the lower tubular member carry all bending loads. In additional system embodiments, the rigid sandwich shell comprises one or more expansion joints. In additional system embodiments, each expansion joint runs between the leading edge tubular member and the upper tubular member.

Additional system embodiments may further include a polyvinyl fluoride (PVF) film that covers the system except for the rigid sandwich shell 102, where the PVF film provides an airfoil shape. In additional system embodiments, the PVF film covers one or more channels formed by the one or more expansion joints. In additional system embodiments, the rigid sandwich shell comprises two thin composite face sheets separated by a low-density core. In additional system embodiments, the two thin composite face sheets comprise carbon fiber and epoxy. In additional system embodiments, the low-density core comprises foam. In additional system embodiments, the low-density core comprises a honeycomb.

Additional system embodiments may include one or more cross-bracing members connected between each of the one or more lower rib members. In additional system embodiments, each of the one or more cross-bracing members are configured to pull the lower tubular member toward the leading edge tubular member.

Another system embodiment may include: a leading edge tubular member; an upper tubular member; one or more upper rib members connected between the leading edge tubular member and the upper tubular member; and a rigid sandwich shell disposed between the upper tubular member and the leading edge tubular member.

Additional system embodiments may include a lower tubular member. Additional system embodiments may include: one or more lower rib members connected between the leading edge tubular member and the lower tubular member. Additional system embodiments may include: a sandwich shear web disposed between the upper tubular member and the lower tubular member. In additional system embodiments, the rigid sandwich shell and the sandwich shear web form a D-shape. In additional system embodiments, the leading edge tubular member, the upper tubular member, and the lower tubular member carry all bending loads. In additional system embodiments, the rigid sandwich shell comprises one or more expansion joints. In additional system embodiments, each expansion joint runs between the leading edge tubular member and the upper tubular member.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
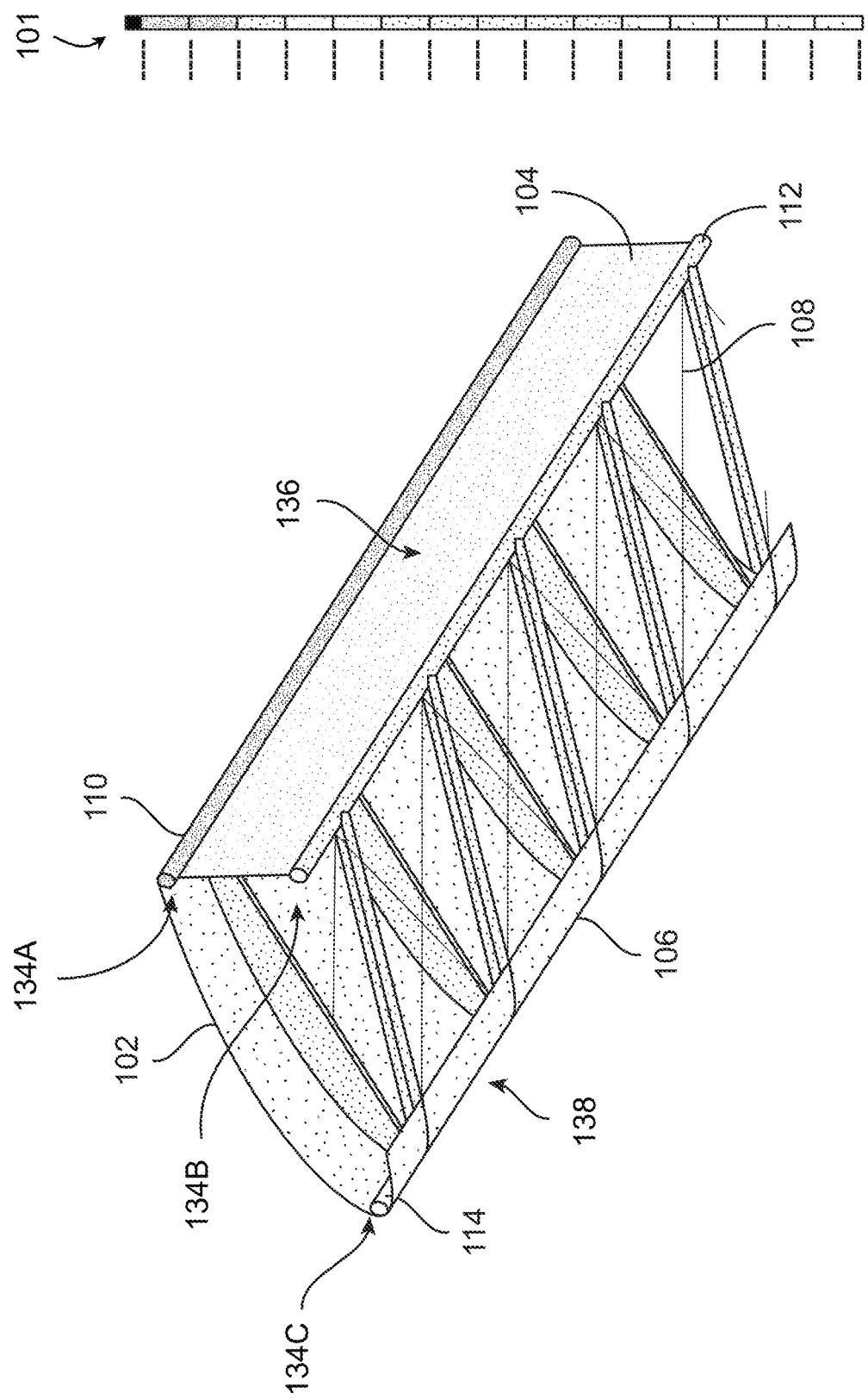
FIG. 1 depicts a bottom perspective view of a D-truss wing structure of an unmanned aerial vehicle.

With respect to FIG. 1, a D-truss wing structure 100 for wing panels of an unmanned aerial vehicle (UAV) is depicted. A thickness 101 of the elements of the D-truss wing structure 100 is shown for reference. While the D-truss wing structure 100 is depicted and described for a UAV, it may also be used with other aerial vehicles in some embodiments. UAVs are aircraft with no onboard pilot and may fly autonomously or remotely. In one embodiment, the UAV is a high altitude long endurance aircraft. In one embodiment, the UAV may have one or more motors, for example, between one and forty (40) motors, and a wingspan between one hundred (100) feet and four hundred (400) feet. In one embodiment, the UAV has a wingspan of approximately two hundred sixty (260) feet and is propelled by a plurality of propellers coupled to a plurality of motors, for example, ten

(10) electric motors, powered by a solar array covering the surface of the wing, resulting in zero emissions. Flying at an altitude of approximately sixty five thousand (65,000) feet above sea level and above the clouds, the UAV is designed for continuous, extended missions of up to months without landing.

The UAV functions optimally at high altitude and is capable of considerable periods of sustained flight without recourse to land. In one embodiment, the UAV may weigh approximately three thousand (3,000) lbs.

The D-truss wing structure 100 may include a rigid sandwich shell 102 that wraps around a leading edge 106, a sandwich shear web 104, an upper tubular truss rib member (124, FIG. 3), a lower tubular truss member (126, FIG. 3), and one or more lightweight cross-bracing members 108. The wing structure 100 may further include an upper tubular member 110, a lower tubular member 112, and a leading-edge tubular member 114 that serve as spar caps and take all bending loads. The three spanwise running tubes are the "caps". The tubular caps 134A, 134B, 134C may include a first tubular cap 134A, a second tubular cap 134B, and a third tubular cap 134C. In one embodiment, the tubular members 110, 112, 114 have a small diameter relative to a thickness of the wing airfoil and/or the height of the shear web 104. In one embodiment, the diameter of the tubular members and wall thicknesses may be optimized for resistance to buckling under all bending loads at minimum weight. In one embodiment, the diameter of the tubular members may be on the order of one tenth of the height of the sandwich shear web 104. In one embodiment, the sandwich shear web 104 may include a main shear web 136 with a ¼-inch thick core. In one embodiment, the upper tubular member 110 may have an approximate material thickness of 0.337-0.360 inches. In one embodiment, the lower tubular member 112 may have an approximate material thickness of 0.266 inches-0.291 inches. In one embodiment, the forward tubular member 114 may have an approximate material thickness of 0.177 inches-0.199 inches. The tubular members 110, 112, 114 may carry all bending loads and are continuous over the length of a separable wing panel, where some number of wing panels (e.g., seven wing panels) are connected end-to-end to form the full wing. More specifically, the upper tubular member 110, lower tubular member 112, and leading tubular member 114 may be arranged at the three extreme points of the "D"-shape formed by the leading edge 106 and the sandwich shear web 104 to carry all bending loads. In some embodiments, the leading edge 106 may include a leading edge shell 138 with a ³⁄₁₆-inch thick core. The shear web 104 is essentially perpendicular to a wing chord plane, which runs from the wing leading edge to the wing trailing edge. The chord plane is angled with respect to the ground by the angle of attack of the wing in level flight. A typical angle of attack for an aerial vehicle with the disclosed D-truss wing structure 100 may be 10-12 degrees, leading edge high. Shear between the tubular members 110, 112, 114 may be carried by the sandwich shear web 104 between the upper tubular member 110 and lower tubular member 112, the rigid sandwich shell 102 between the upper tubular member 110 and the leading tubular member 114, and the light weight cross-bracing 108 between the lower tubular member 112 and the leading tubular member 114. In one embodiment, the rigid sandwich shell 102 may have an approximate material thickness of 0.177 inches-0.199 inches and the shear sandwich web 104 may have an approximate material thickness of 0.245 inches-0.266 inches. In some embodiments, the disclosed ranges may be wider to accommodate aerial vehicles having between 1 to 40 motors and/or 100 to 400 feet of span.

Figure 2:
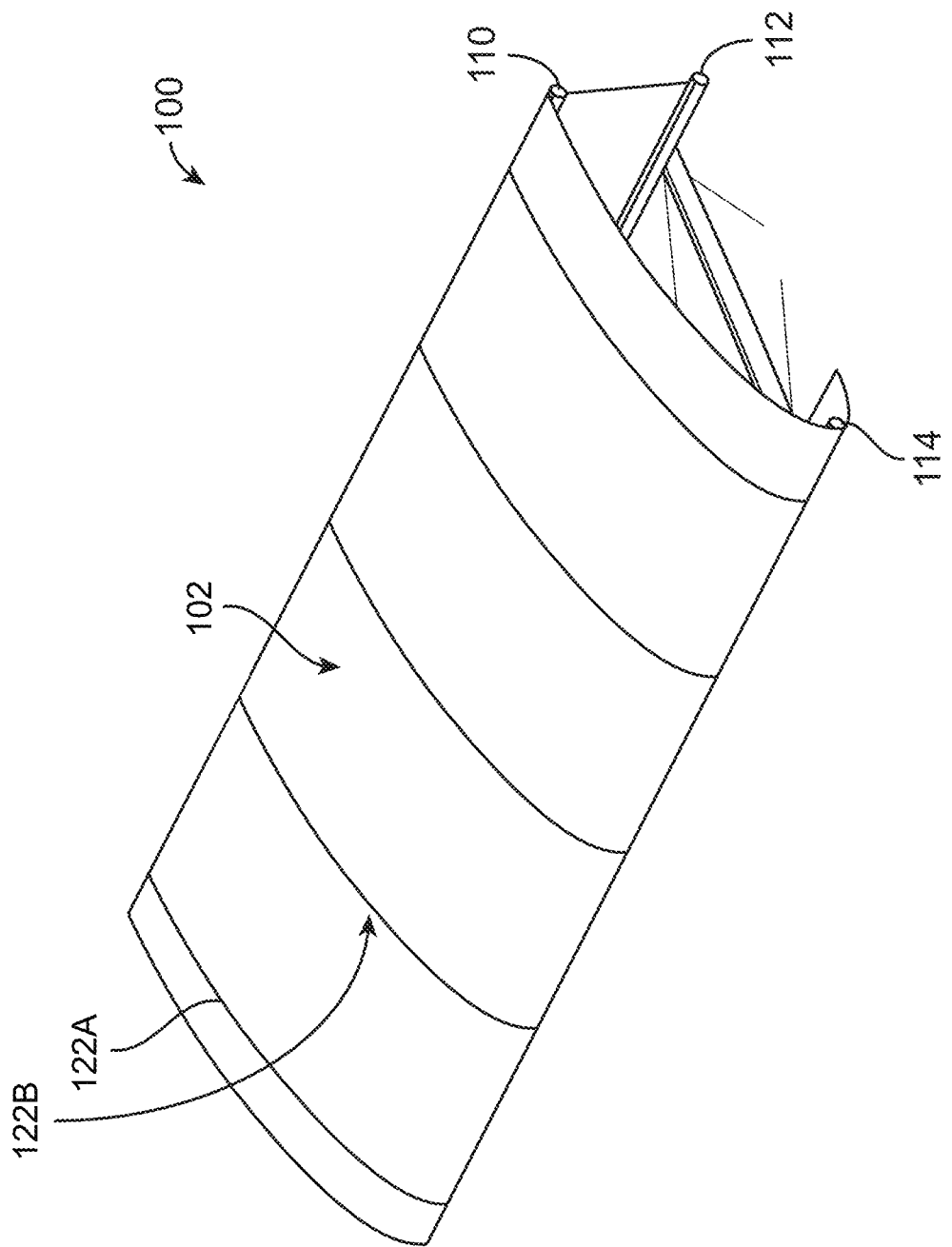
FIG. 2 depicts a top perspective view of a rigid shell of the D-truss wing structure of FIG. 1.

With respect to FIG. 2, the rigid sandwich shell 102 is illustrated. In one embodiment, the rigid sandwich shell 102 carries sheet. In one embodiment, the rigid sandwich shell 102 may have a plurality of expansion joints 122A, 122B. Each expansion joint 122A, 122B may run from the leading edge of the sandwich edge shell 114 to the rear of the rigid sandwich shell 102 at the upper tubular member 110. In one embodiment, the expansion joints 122A, 122B allow the rigid sandwich shell 102 to handle the "spanwise" expansion and contraction associated with bending, and also allow for the rigid sandwich shell 102 to carry in-plane and torsional shear. In some embodiments, the expansion joints 122A, 122B provide for spanwise expansion, but still carry shear. Additionally, the rigid sandwich shell 102 may provide for stabilizing the upper tubular member 110 and the leading tubular member 114. The rigid sandwich shell 102 may also maintain the airfoil shape. In one embodiment, all elements of FIG. 1 may be made of composite materials, such as carbon fiber and epoxy. In some embodiments, the sandwich shell 102 may be made from non-conductive materials, such as Kevlar (aramid) or fiberglass so as to avoid electrical shorting of the solar array. The rigid sandwich shell 102 and the sandwich shear web 104 may be made of two thin composite face sheets separated by a low-density core. The composite may be made of carbon fiber and epoxy. In other embodiments, the composite may be made of Kevlar or fiberglass. The low-density core may be made of either foam or honeycomb. The combination provides high bending stiffness at minimal weight. In one embodiment, a polyvinyl fluoride (PVF) film, such as Tedlar film covers the wing structure 100 (except for the rigid sandwich shell 102) and provides the airfoil shape. In other embodiments, a non-structural material may be used to cover the wing structure 100 (except for the rigid sandwich shell 102) to provide the airfoil shape. In one embodiment, the Tedlar film may also be used to cover channels formed by the expansion joints 122A, 122B. In other embodiments, a tape having stretch characteristics may be used to cover channels formed by the expansion joints 122A, 122B.

In one embodiment, the rigid sandwich shell 102 may have a molded surface that is substantially hard and smooth to allow solar modules to be bonded directly thereto. In one embodiment, the face sheet material of the rigid sandwich shell 102 may be made of Kevlar and epoxy in order to be non-conductive.

Figure 3:
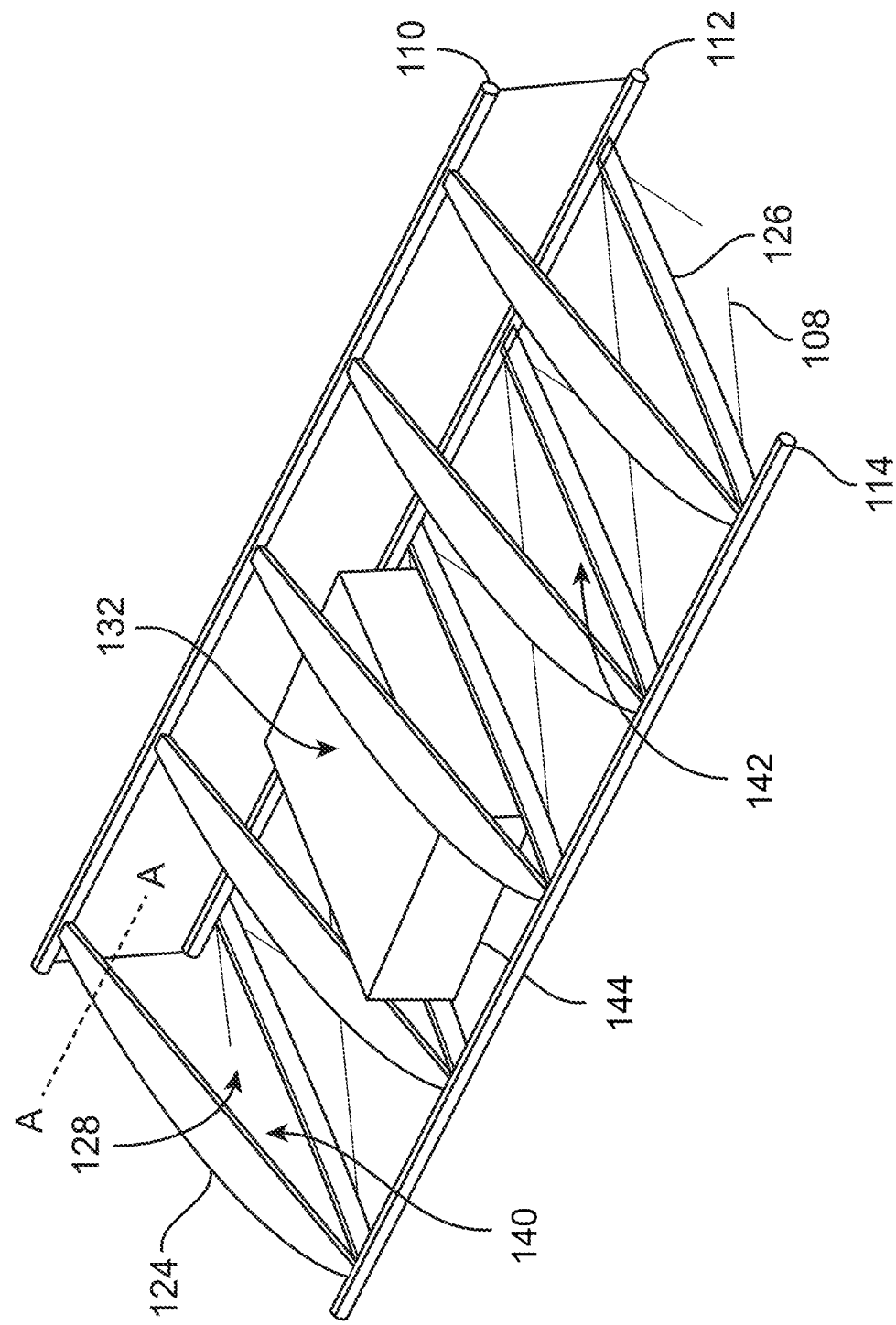
FIG. 3 depicts a top perspective view of the D-truss wing structure of FIG. 1 with the rigid shell of FIG. 2 removed.

With respect to FIG. 3, the rigid sandwich shell 102 has been removed to reveal the upper tubular member 110, the lower tubular member 112, and the leading tubular member 114 being held in position relative to each other. More specifically, a plurality of upper rib members 124 are connected to the upper tuber member 110 and leading tubular member 114. In one embodiment, the upper rib members 124 connect to and hold the upper tubular member 100 and leading tubular member 114 in position relative to each other. Additionally, a plurality of lower rib members 126 are connected to the lower tubular member 112 and leading tubular member 114.

Figure 4:
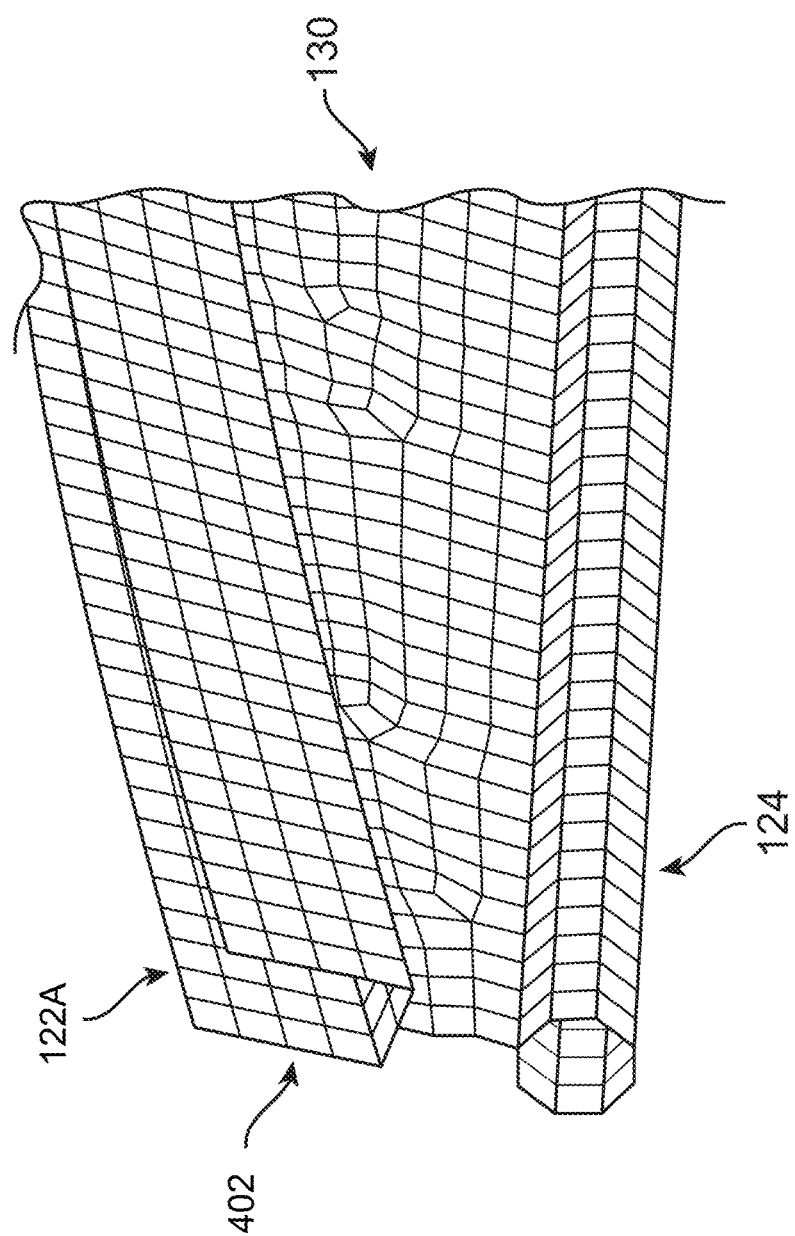
FIG. 4 depicts a cut-away, cross-section, side perspective view of an upper tubular truss rib member of the D-truss wing structure about line A-A of FIG. 3.

With respect to FIG. 4, the upper rib members 124 support the rigid sandwich shell (102, FIG. 2) through small webs 130 connected to the expansion joints. The lower rib member (126, FIG. 3) react the cross-bracing tensile loads. More specifically, the cross-bracing members (108, FIG. 3) only carry tensile loads, since the cross-bracing members (108, FIG. 3) may buckle under compressive loads. Therefore, the cross-bracing members (108, FIG. 3) act to pull the lower tubular members (112, FIG. 3) and the forward tubular members (114, FIG. 3) toward each other. The lower rib members (126, FIG. 3), which are loaded in compression in this case, keep the lower tubular members (112, FIG. 3) and the forward tubular members (114, FIG. 3) separated. In one embodiment, each expansion joint 122A creates an expansion channel 402. In one embodiment, the upper rib member 124 is a tuber truss member.

With respect to FIGS. 2-3, in one embodiment, the interconnection of an upper rib member 124, a lower rib member 126, the tubular members 110, 112, 114, the rigid sandwich shell 102 that wraps around the leading edge 106, and the sandwich shear web 104 generally forms a D-shape. The 'D' shape may not include a shell between the leading edge tubular member 114 and the lower tubular member 112. Therefore, each D-truss wing structure 100 may have series of so-called "D-truss" structures 128. In one embodiment, the upper rib members 124 and the lower rib members 126 may have an approximate material thickness of 0.038 inches-0.062 inches. In one embodiment, the upper rib members 124, the lower rib members 126, and the tubular members 110, 112, 114 may be made of carbon fiber.

Figure 5:
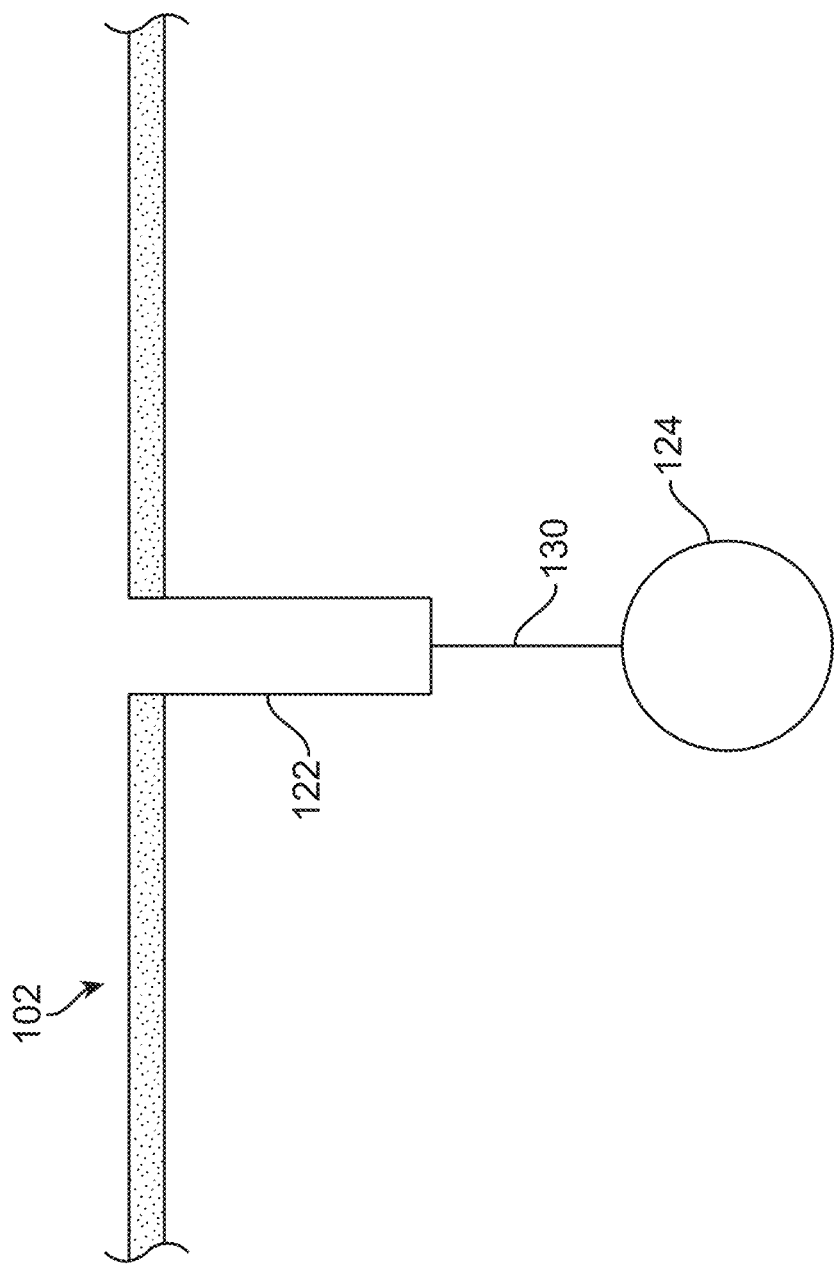
FIG. 5 depicts a cut-away, cross-section view of the upper tubular truss rib member of FIG. 4.

For additional clarity, a cut-away, cross-section view of the upper tubular truss rib member 124 of FIG. 4 is shown in FIG. 5. One or more expansion joints 122A are provided in the rigid sandwich shell 102 proximate the upper tubular truss rib member 124. Small webs 130 connect the rib member 124 to the one or more expansion joints 122A.

Returning to FIG. 3 the lightweight cross-bracing members 108 are also shown. In one embodiment, the lightweight cross-bracing members 108 complete the torsion load path across the bottom of the D-truss wing panel structure (100, FIG. 2). In one embodiment, the lightweight cross-bracing members 108 may be installed without provisions for adjusting tension, effectively giving the lightweight cross-bracing members 108 zero preload. In one embodiment, the lower rib members 126 may support batteries for operating the UAV and the battery support structures 132 might take the place of the lightweight cross-bracing members 108. In one embodiment, the battery support structure 132 may be a plate or a box that occupies the area that would otherwise be occupied by a cross-bracing member 108 pair in rib bays (e.g., spaces between adjacent ribs) that have batteries. The battery plate or box 132 may be strong enough to take the loads normally taken by the cross-bracing members 108. Batteries will only occupy a small fraction of the total number of rib bays (e.g., 22 out of 148 rib bays in one embodiment) and the remaining rib bays may still have cross-bracing members 108. In one embodiment, the D-truss wing panel structure (100, FIG. 2) may include one or more tubular truss members 140, 142. In one embodiment, the D-truss wing panel structure (100, FIG. 2) may include X-Bracing 144 for torsion.

Figure 6:
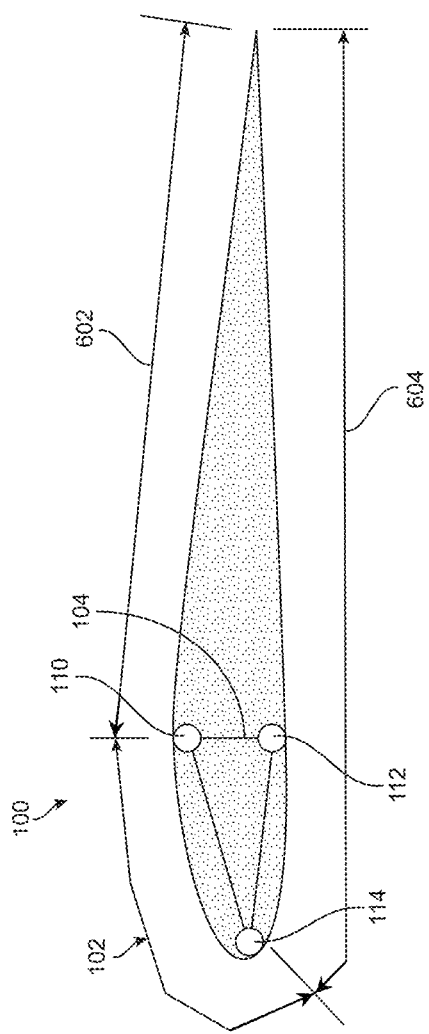
FIG. 6 depicts a side view of a wing including the D-truss wing structure of the unmanned aerial vehicle.

FIG. 6 depicts a side view of a wing 600 including the D-truss wing structure 100 of the unmanned aerial vehicle. The wing 600 may include the sandwich shell 102 between the leading edge tubular member 114 and the upper tubular member 110; the sandwich shear web 104 disposed between the upper tubular member 110 and the lower tubular member 112; a first plastic membrane skin 602 on a top surface of the wing 600; and a second plastic membrane skin 604 on a bottom surface of the wing 600. In one embodiment, a polyvinyl fluoride (PVF) film, such as Tedlar film covers the wing 600 (except for the rigid sandwich shell 102) and provides the airfoil shape. In other embodiments, a non-structural material may be used to cover the wing 600 (except for the rigid sandwich shell 102) to provide the airfoil shape.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   a leading edge tubular member;
   an upper tubular member;
   a rigid sandwich shell disposed between the upper tubular member and the leading edge tubular member, wherein the rigid sandwich shell comprises one or more expansion joints; and
   a sandwich shear web disposed between the upper tubular member and a lower tubular member;
   wherein the rigid sandwich shell and the sandwich shear web forms a D-shape.

2. The system of claim 1, wherein each expansion joint creates an expansion channel.

3. The system of claim 1, wherein the one or more expansion joints allow the rigid sandwich shell to handle spanwise expansion associated with bending.

4. The system of claim 1, further comprising:
   one or more lower rib members connected between the leading edge tubular member and the lower tubular member; and
   one or more upper rib members connected between the leading edge tubular member and the upper tubular member.

5. The system of claim 4, wherein the leading edge tubular member, the upper tubular member, and the lower tubular member carry all bending loads.

6. The system of claim 4, further comprising:
   one or more cross-bracing members connected between each of two or more lower rib members.

7. The system of claim 6, wherein each of the one or more cross-bracing members are configured to pull the lower tubular member toward the leading edge tubular member.

8. The system of claim 1, wherein each expansion joint runs between the leading edge tubular member and the upper tubular member.

9. The system of claim 8, further comprising a polyvinyl fluoride (PVF) film that covers the system except for the rigid sandwich shell, wherein the PVF film provides an airfoil shape, and wherein the PVF film covers one or more channels formed by the one or more expansion joints.

10. The system of claim 1, wherein the rigid sandwich shell comprises two composite face sheets separated by a core, wherein the two composite face sheets comprise carbon fiber and epoxy.

11. The system of claim 10, wherein the core comprises foam.

12. The system of claim 10, wherein the core comprises a honeycomb.

13. A system comprising:
    a leading edge tubular member;
    an upper tubular member; and a rigid sandwich shell disposed between the upper tubular member and the leading edge tubular member, wherein the rigid sandwich shell comprises one or more expansion joints.

14. The system of claim 13, further comprising:
one or more upper rib members connected between the leading edge tubular member and the upper tubular member.

15. The system of claim 13, further comprising:
a lower tubular member.

16. The system of claim 15, further comprising:
one or more lower rib members connected between the leading edge tubular member and the lower tubular member.

17. The system of claim 16, further comprising:
a sandwich shear web disposed between the upper tubular member and the lower tubular member.

18. The system of claim 17, wherein the rigid sandwich shell and the sandwich shear web form a D-shape.

19. The system of claim 18, wherein the leading edge tubular member, the upper tubular member, and the lower tubular member carry all bending loads.

20. The system of claim 18, wherein each expansion joint creates an expansion channel, and wherein each expansion joint runs between the leading edge tubular member and the upper tubular member.

* * * * *